US012703344B2

(12) United States Patent
Boyde et al.

(10) Patent No.: US 12,703,344 B2
(45) Date of Patent: Aug. 11, 2026

(54) ELECTRICAL CONVERTER IN A HYBRID VEHICLE INDICATING INTERMITTENT CYLINDER OPERATION

(71) Applicant: Rolls-Royce Solutions GmbH, Friedrichshafen (DE)

(72) Inventors: Jan Boyde, Friedrichshafen (DE); Marcus Fackler, Ravensburg (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 44 days.

(21) Appl. No.: 18/632,768

(22) Filed: Apr. 11, 2024

(65) Prior Publication Data

US 2024/0253614 A1 Aug. 1, 2024

Related U.S. Application Data

(63) Continuation of application No. PCT/EP2022/078597, filed on Oct. 14, 2022.

(30) Foreign Application Priority Data

Oct. 14, 2021 (DE) ..................... 10 2021 126 722.6
Oct. 14, 2022 (WO) ................. PCT/EP2022/078597

(51) Int. Cl.
*B60W 20/10* (2016.01)
*B60W 10/06* (2006.01)
(Continued)

(52) U.S. Cl.
CPC ............ *B60W 20/10* (2013.01); *B60W 10/06* (2013.01); *B60W 10/08* (2013.01); *B60W 10/30* (2013.01)

(58) Field of Classification Search
CPC ...... B60W 20/10; B60W 10/06; B60W 10/08; B60W 10/30; B60W 20/11; B60W 20/50;
(Continued)

(56) References Cited

U.S. PATENT DOCUMENTS 7,707,874 B2 * 5/2010 Suzuki .................. G01M 15/11 73/114.04
8,538,626 B2 * 9/2013 Kumar .................... F02D 29/06 123/406.27

(Continued)

OTHER PUBLICATIONS

International Search Report and Written Opinion dated Jan. 19, 2023 for International Patent Application No. PCT/EP2022/078597 (13 pages).

*Primary Examiner* — Brian P Sweeney
(74) *Attorney, Agent, or Firm* — TAYLOR & EDELSTEIN, PC

(57) ABSTRACT

A method for operating a hybrid drive includes the steps of: providing an internal combustion engine, an electric machine, a converter, and a drive shaft, the internal combustion engine including a combustion engine, the converter being electrically connected to the electric machine, the internal combustion engine and the electric machine being connected to each other in a torque-transmitting manner by way of the drive shaft; determining a rotational motion signal associated with the drive shaft, the rotational motion signal being determined by way of an electrical converter variable of the converter; and determining a signal characterization of a momentary curve of the electrical converter variable, the signal characterization indicating an intermittent cylinder operation of the combustion engine.

19 Claims, 3 Drawing Sheets

(51) Int. Cl.
*B60W 10/08* (2006.01)
*B60W 10/30* (2006.01)

(58) Field of Classification Search
CPC ........... B60W 30/182; B60W 30/1884; B60W 40/00; B60W 50/085; B60W 50/14; Y02T 10/62; B60L 3/0023; B60L 3/12; B60L 50/10; F02D 2200/1015; F02D 29/02; F02D 41/1498; B60K 6/48; B60K 6/20
See application file for complete search history.

(56) References Cited

U.S. PATENT DOCUMENTS

| | | | | |
|---|---|---|---|---|
| 2007/0093359 | A1 | 4/2007 | Kobayashi et al. | |
| 2017/0225671 | A1 | 8/2017 | Ukegawa et al. | |
| 2023/0095324 | A1* | 3/2023 | Witt | F02D 41/22 73/114.01 |

* cited by examiner

ELECTRICAL CONVERTER IN A HYBRID VEHICLE INDICATING INTERMITTENT CYLINDER OPERATION

CROSS REFERENCE TO RELATED APPLICATIONS

This is a continuation of PCT application no. PCT/EP2022/078597, entitled "METHOD FOR CONTROLLING A HYBRID DRIVE, HYBRID DRIVE, CONTROL UNIT, VEHICLE", filed Oct. 14, 2022, which is incorporated herein by reference. PCT application no. PCT/EP2022/078597 claims priority to German patent application no. 10 2021 126 722.6, filed Oct. 14, 2021, which is incorporated herein by reference.

BACKGROUND OF THE INVENTION

1. Field of the Invention

The present invention relates to vehicles, and, more particularly, to hybrid drives of vehicles.

2. Description of the Related Art

Methods for controlling drives with combustion engines, in particular to recognize operating events such as, for example, misfires, are generally known. The concept of recognition of operating events on the basis of a speed signal which presents a possibility of the aforementioned rotational motion signal has been proven.

DE 10 2014 219 043 A1, for example, describes a method for detecting misfiring in an internal combustion engine, which is coupled to the drive train. For this purpose, a first speed sensor and a second speed sensor are arranged on an input side and an output side of the dual mass flywheel, wherein at least the second speed sensor is a high-resolution design.

DE 10 2017 127 725 A1 describes a method for recognition of misfiring of a combustion engine with a dual mass flywheel with a sprocket on the primary flywheel mass, with a device for monitoring the tooth-to-tooth rotational speed of the primary flywheel mass based on monitoring of the sprocket teeth, wherein the signal of the tooth-to-tooth speed is being analyzed, wherein the gradient of the tooth-to-tooth rotational speed in an increase phase of the tooth-to-tooth rotational speed is determined and is compared with a predefined limit value for the gradient.

Even though the described approaches, in particular with high resolution speed sensors, essentially already make a diagnosis of operating events advantageously possible and in particular a recognition of misfiring, such approaches are worthy of further improvement, in particular in regard to a reduced instrumental cost. A diagnostic option should be improved, in particular for a hybrid drive.

It would therefore be especially desirable to make reliable recognition of misfire at a relatively low or simplified instrumental cost possible.

What is needed in the art is an improved method wherein the aforementioned disadvantages are at least partially eliminated. What is also needed in the art is reliable recognition of misfires with relatively low or simplified instrumental cost.

SUMMARY OF THE INVENTION

The present invention relates to a method for operating a hybrid drive, wherein the hybrid drive includes an internal combustion engine and an electric machine. The present invention relates to a hybrid drive, a control unit and a vehicle. The aforementioned hybrid drive includes: an internal combustion engine with a combustion engine and an electric machine to which a converter is electrically connected, wherein the combustion engine and the electric machine are connected to each other in a torque transmitting manner by way of a drive shaft, wherein a rotational motion signal associated with the drive shaft is determined.

The present invention, in a first aspect, provides a method for operating a hybrid drive which includes: an internal combustion engine having a combustion engine and an electric machine to which a converter, in particular an AC converter, is electrically connected, wherein the combustion engine and the electric machine are connected to each other in a torque transmitting manner by way of a drive shaft, wherein a rotational motion signal associated with the drive shaft is determined.

According to the present invention the method provides that the rotational motion signal is determined by way of an electrical converter variable of the converter; and a signal characteristic of a momentary curve of the converter variable is determined, wherein the signal characteristic is designed to indicate an intermittent cylinder operation of the combustion engine.

The present invention is based on the consideration that operating events in an internal combustion engine which includes a combustion engine can be detected within the scope of a hybrid drive by way of observation and/or monitoring of a rotational motion of the drive shaft, without having to directly measure the latter. Within the scope of the hybrid drive, the combustion engine and the electric machine are connected to each other via the drive shaft in a torque transmitting manner.

Changes and/or deviations of a rotational motion of the drive shaft which are to be considered normal can also be observed in a detected rotational motion signal assigned to the drive shaft, the cause of which can be traced back to the rotational motion of the drive shaft without however taking direct measurements.

Generally, a drive shaft is understood to be a torque-transmitting line between the combustion engine and the electric machine; developed further, the drive shaft can be composed of an engine shaft of the combustion engine and a rotor shaft of a rotor, potentially with a coupling.

Determination of the rotational motion signal facilitates in particular improved diagnosis of operational events, optionally reliable recognition of misfire or respectively detection of intermittent cylinder operation of the combustion engine. Misfire is constantly the cause for intermittent cylinder operation. Fundamentally, in this instance, intermittent cylinder operation is generally understood to be a substantially abnormal change and/or deviation in the cylinder operating cycle.

A hybrid internal combustion engine includes an internal combustion engine and an electric machine. An electric machine can be in particular a motor/generator, in particular however, a generator. A noteworthy further development of the present invention refers especially advantageously to a synchronous machine, in particular a synchronous generator.

The electric machine is electrically connected to a converter. According to the present invention, this can be used to detect a rotational motion signal assigned to the drive shaft.

The present invention is based, in particular, on the consideration that control electronics and power electronics of the electric machine can also be used advantageously for improvement of the operation of the combustion engine; in particular, by way of control and adjustment of the electric machine, the control and adjustment of the combustion engine can also be improved. This may be achieved by utilizing the control and adjustment information of the electric machine also for control and/or adjustment of the combustion engine or, in the simplest case, for monitoring of the combustion engine.

The present invention is moreover based on the consideration that, via a torque transmitting drive shaft between the combustion engine and the electric machine—in particular in the embodiment of a torsionally rigid connection or with a coupling, for example via a coupling and/or a gearbox—a rotational motion signal of the electric machine and an engine rotational motion signal of the combustion engine are generally in an already known or determinable—in particular constant—relationship with one another.

The rotational motion signal is determined based on the findings according to the present invention, by way of an electrical converter variable of the converter. As a result of the connection of the drive shaft to the electric machine and the combustion engine, the rotational motion signal of the drive determined by way of an electrical converter variable of the converter can be assigned to the drive shaft and is thus designed, according to the present invention, to indicate an intermittent cylinder operation of the combustion engine.

The present invention has recognized that a converter is regularly electrically connected to an electric machine of a hybrid drive. The converter can, in particular, be part of the electric machine; in this case the electric machine includes a converter. In this respect the converter is designed to receive at least partially currents and/or voltages of the electric machine, in particular the rotor and/or stator of the electric machine. The rotational motion signal results from the momentary angle of rotation of a rotor of the electric machine or includes at least information in regard to the momentary angle of rotation of the rotor of the electric machine.

The converter may be combined with a control unit and/or the converter can be integrated within the scope of a control unit. Efficient computing or signal processing components, in particular signal processors and optionally sensors, are generally available for the converter and/or the control unit, which would in any case be required for the control of the electric machine and/or for converting or inverting of the current of the electric machine.

Such computing and/or signal processing components, in particular control and/or signal processing devices and/or sensors for the converter, are designed or can be designed and used to determine a rotational motion signal of the electric machine which describes the momentary rotational angle of a rotor of the electric machine with relatively high resolution.

The converter has, for example, a signal unit by way of which a rotational motion signal can be provided by way of an electrical converter variable.

In other words, the rotational motion signal of the electric machine-which describes the rotational angle of a rotor of the electric machine or at least includes information in regard to the momentary angle of rotation of the rotor of the electric machine—is also available at the converter by way of the electrical converter variable.

The momentary curve of the signal in the present invention is understood to be a time- or angle resolved curve of a signal; the resolution of the signal of the transient progression is accordingly clearly smaller compared to recognizable operative events, in particular designed for resolution of an operative cycle of the combustion engine, namely at least of an ignition or cylinder cycle in such a way that a signal characterization that deviates from the normal progression of an ignition or cylinder cycle is recognizable. The signal characterization is designed in particular to indicate an intermittent cylinder operation of the combustion engine.

The rotational motion signal initially describes indirectly or directly a rotational motion of the rotor or of a rotor shaft of the electric machine because the converter receives currents and/or voltages of the electric machine, in particular of the rotor and/or stator of the electric machine.

Since the rotor is connected torsionally rigid or via a fixed transmission- or reduction ratio with the engine shaft of the combustion engine, the aforementioned rotational motion signal indirectly or directly describes collectively also a rotational motion of the drive shaft and thus also the engine shaft of the combustion engine.

Generally, a drive shaft is understood to be a torque-transmitting line; the latter can be composed of the engine shaft of the combustion engine and rotor shaft of the rotor. The operational behavior, in particular the rotational motion of the engine shaft of the combustion engine, contains again information via a potentially predetermined intermittent cylinder operation of the combustion engine.

In the context of an internal combustion engine, this rotational motion signal—provided by way of an electrical converter variable—can therefore be converted, in particular recalculated, into an engine rotational motion signal due to the torque-transmitting connection via the drive shaft. The rotational motion signal determined by the converter, but assigned to the drive shaft, can be interpreted as an engine-rotational motion signal and can be used advantageously for diagnostic purposes, in particular for recognition of operational events—such as for example misfiring—of the combustion engine.

Thanks to such a process according to the concept of the present invention, dependency of expensive sensors can be reduced. In particular, a speed sensor on the combustion engine for such diagnostic purposes can be foregone.

The rotational motion of the drive shaft is to be understood as a variable, characterizing the rotational motion of the drive shaft, in particular a speed and/or a torque. Accordingly, a rotational motion signal is a signal describing the rotational motion.

The rotational motion signal optionally characterizes a rotational position and/or a rotational speed. Advantageously, one of the variables rotational position, speed, and torque can be used to form another variable derived from these variables by derivation and/or integration.

A "signal characterization" includes, in particular, a momentary curve of the rotational motion signal that deviates from a quasiperiodic target momentary curve and/or a missing target rotational acceleration. A momentary curve deviating from a target momentary curve exhibits in particular an aperiodic momentary curve of the rotational motion signal. The target momentary curve describes the progression of the rotational motion signal, in particular the speed, that is the rotational speed that is expected during normal operation of the combustion engine. The target momentary curve is in particular characterized by a speed momentary curve that oscillates around an average speed, whereby the oscillations occur in the ignition cycle and are each caused by an acceleration of the crankshaft caused by an ignition. In the event of a misfire or similar deviation during operation of the combustion engine, the momentary curve of the rotational motion signal therefore deviates from a target momentary curve; in particular, there is no target rotational acceleration due to the improper ignition. A "signal characterization" thus exhibits in particular a decelerated, sub-optimal or missing rotational acceleration, that is, increase in angle speed, in momentary progression of the rotational motion signal, in particular compared to a quasi-periodic target momentary curve according to the ignition behavior.

The speed and/or a rotational speed can optionally be determined on the basis of a temporal change in the rotational position.

The rotational motion includes in particular the rotational motion of a rotor of the electric machine and also the rotational motion of an engine shaft of the internal combustion engine. In an optional further development, the rotor of the electric machine is connected or coupled to the motor shaft of the internal combustion engine in a torsionally rigid manner, particularly optionally via a common drive shaft. In the latter modification, the rotor of the electric machine can be connected to the engine shaft in a torque-transmitting manner via a gearbox or similar transmission device or coupling and is thus coupled to one another. If the electrical machine and the combustion engine are connected to each other via a gearbox or similar transmission device, the rotational movement of the engine shaft can be derived in particular from the rotational movement of the rotor, in other words, it is in a fixed transmission or reduction ratio.

Within the scope of an optional further development, it is provided that the electrical converter variable is a converter current and/or a converter voltage or includes the converter current and/or the converter voltage.

The electrical converter variable can also be or include a line current and/or a line voltage of the converter.

Optionally, the line voltage is the result of, or is influenced by a counter-voltage or is otherwise related to a counter-voltage induced by the rotor into the stator of the electric machine.

Provision is optionally made that the momentary curve of the electrical converter variable is a momentary curve of a converter current and/or a converter voltage, in particular a line current and/or a line voltage of the converter.

Within the scope of an optional further development, it is provided that the rotational motion signal is determined by way of the line current and a phase position of the line current, optionally in relation to a momentary voltage of the converter.

It is optional that the electric machine is controlled by the converter by way of a vector control. Optionally, the electric machine is controlled by the converter by way of a sensor-less control system. It is optional that the electric machine is controlled by the converter by way of a sensor-less vector control. With sensor-less control of the electric machine, the converter is advantageously designed to provide a rotational motion signal without being dependent on a rotational sensor. This further reduces the amount of equipment required to provide the rotational motion signal. In the case of a sensor-less control system, the rotational motion signal is determined by measuring the electrical parameters of the converter and/or at the coils of the electric machine, optionally on at least one stator coil of the electric machine.

Within the scope of an optional further development, it is provided that the rotational motion and/or the signal characterization is determined by way of the momentary curve of the converter variable and by a mathematical machine model. A mathematical machine model advantageously includes target values of the electrical converter variable, optionally the line currents and/or the line voltage for defined conditions of the electric machine, in particular for defined rotational positions of the rotor. The mathematical machine model optionally includes a number of reference values for the electrical converter variable, each having a value for a calculated rotational position of the rotor assigned to it. The calculated rotational position is optionally determined in that the electrical converter variable is allocated to a suitable reference value for the electrical converter variable.

Within the scope of an optional further development, it is provided that the electrical converter variable is a counter voltage, initiated optionally in the stator, wherein the mathematical machine model optionally includes a number of reference counter voltage values which are respectively allocated to a value for a calculated rotational position, wherein the calculated rotational position is determined in that the counter voltage is assigned to a suitable reference counter voltage value.

Within the scope of an optional further development, it is provided that the electrical converter variable is a line current, wherein the mathematical machine model optionally includes a number of reference current values respectively allocated to a value for a calculated rotational position, wherein the calculated rotational position is determined in that the line current is assigned to a suitable reference current value.

"Suitable" means, in particular, that the reference current value with the smallest deviation from the measured line current is selected from the number of reference current values, and that from this reference current value the assigned calculated rotational position is selected.

The same applies to the reference values of other electrical converter variables, in particular the reference counter voltage value. The functionality of all the approaches described here for assigning a suitable reference value optionally corresponds essentially to a look-up table.

The line current and/or the line voltage and/or the counter voltage is optionally measured on at least two conductors, optionally two or three conductors. Optionally, the conductors are designed as electrical conductors in the vicinity of the converter or on, or respectively in, the converter. In particular, the conductors can be an electrical supply line to the converter. In a modified further development, the conductors can also in principle include the conductors of a stator of the electric machine.

In an optional further development, it is provided that the converter includes an inverter circuit with an inverter (alternating current converter) which includes a number of power electronic switches (controlled bridges) or similar power electronic components. Among other components these may include or be power transistors such as metal-oxide-semiconductor-field transistors (MOSFET), insulated gate bipolar transistors, also in particular with insulated gate electrode (IGBT) or IGC-thyristors (IGCT); these can generate a variable voltage by way of pulse width modulation (PWM). One or more of the power electronic switches can be timed based on the rotational movement, optionally a speed.

Optionally, the timing signal can be tapped from the line current of a conductor, in particular a supply line in the vicinity of the converter or on, or respectively in, the converter and/or on the conductor of a stator of the electrical machine. In particular, power transistors such as metal-oxide-semiconductor-field transistors (MOSFET), insulated gate bipolar transistors (IGBT) or IGC-thyristors (IGCT) are timed by way of the rotational motion signal. In particular, the timing signal of the power electronic switch (controlled bridges) or similar power electronic component is the rotational motion signal characterizing the speed.

As an example of an optional further development, a converter with power electronic switches for creation of the inverter circuit (alternating current converter) can be utilized in a hybrid system in the electric machine or in the periphery of the electric machine, in particular, a generator. The converter or the inverter circuit (alternating current converter) very accurately measures the speed of the drive shaft in order to be able to precisely time its power transistors, for example IGBTs (insulated gate bipolar transistor). Intermittent cylinder operation could be detected during the measurement and could be processed with the help of a system control device. It is then possible to reduce the output of the internal combustion engine or the combustion engine, optionally a diesel engine of the internal combustion engine, within an acceptable range so that the engine and a coupling on the drive shaft between the internal combustion engine and the generator are not overloaded. Within the scope of an optional further development, it is provided that in the event of an issue, in particular a notification of the signal characterization, a fail-safe operating mode of the internal combustion engine, in particular with reduced power, is activated.

Through such a fail-safe operating mode, possible damage to the internal combustion engine which could occur during an intermittent cylinder operation can advantageously be avoided. The internal combustion engine can advantageously continue to be operated in the secure fail-sale operating mode until repairs are made.

The present invention provides, in a second aspect, a hybrid drive, including:

- an internal combustion engine including a combustion engine, and
- an electric machine to which a converter is electrically connected, wherein
- the combustion engine and the electric machine are connected with one another via a drive shaft in a torque transmitting manner, wherein
- the hybrid drive is designed to determine a rotational motion signal assigned to the drive shaft.

Regarding the hybrid drive, it is provided according to the second aspect of the present invention that the hybrid drive, optionally the converter and/or a signal unit, is designed to determine a rotational motion signal via an electrical converter variable of the converter, and that the hybrid drive has a recognition unit which is designed to determine a signal characterization of a momentary curve of the electrical converter variable, and to indicate an intermittent cylinder operation of the combustion engine depending on the signal characterization.

A further development of the hybrid drive provides that the electric machine can be controlled via the converter by way of a sensor-less control, in particular by way of a sensor-less vector control.

A further development of the hybrid drive provides that the electrical converter variable is a converter current and/or a converter voltage. The electrical converter variable can, in particular, be a line current and/or a counter voltage initiated in the stator. The electrical converter variable may also encompass one or several of the aforementioned variables.

In a third aspect, the present invention provides a control unit for a hybrid drive according to the second aspect of the present invention. According to the third aspect of the present invention, it is provided that the control unit is designed to implement the method according to the first aspect of the present invention and/or has a recognition unit designed to determine a signal characterization of a momentary curve of an electrical converter variable, and to indicate an intermittent cylinder operation of the internal combustion engine as a function of the signal characterization.

In a fourth aspect, the present invention provides a vehicle, in particular a watercraft, land vehicle, or aircraft, having a hybrid drive according to the second aspect of the present invention and/or a control unit according to the third aspect of the present invention and/or is designed to perform a method according to the first aspect of the present invention.

It is to be understood that the method according to the first aspect of the present invention, the hybrid drive according to the second aspect of the present invention, the control unit according to the third aspect of the present invention and the vehicle according to the fourth aspect of the present invention present the same or similar subclaims, as recorded in particular in the dependent claims. Thus, in the case of a further development of one aspect of the present invention reference is also made to the further development of the other aspects of the present invention.

Embodiments of the present invention are described below. The representations of the embodiments are not intended to necessarily be to scale. Where useful, the drawing is executed in a schematized and/or slightly distorted form for explanatory purposes. Herein it must be considered that a variety of modifications and alterations to the form and detail of an embodiment can be made without deviating from the general idea of the present invention. The features of the present invention disclosed in the description, in the drawings and in the claims, may be essential—individually and in any combination—for the further development of the present invention. In addition, all combinations of at least two of the features disclosed in the description, drawings and/or claims fall within the scope of the present invention. The general idea of the present invention is not limited to the exact scope or detail of the optional embodiment shown and described below, or to one subject which would be limited in comparison with the subject claimed in the claims. In the case of specified design ranges, values within the specified limits should also be disclosed as limit values and should be able to be used and claimed as desired. Further advantages, features and details of the present invention are shown in the following description of the optional embodiments and in the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
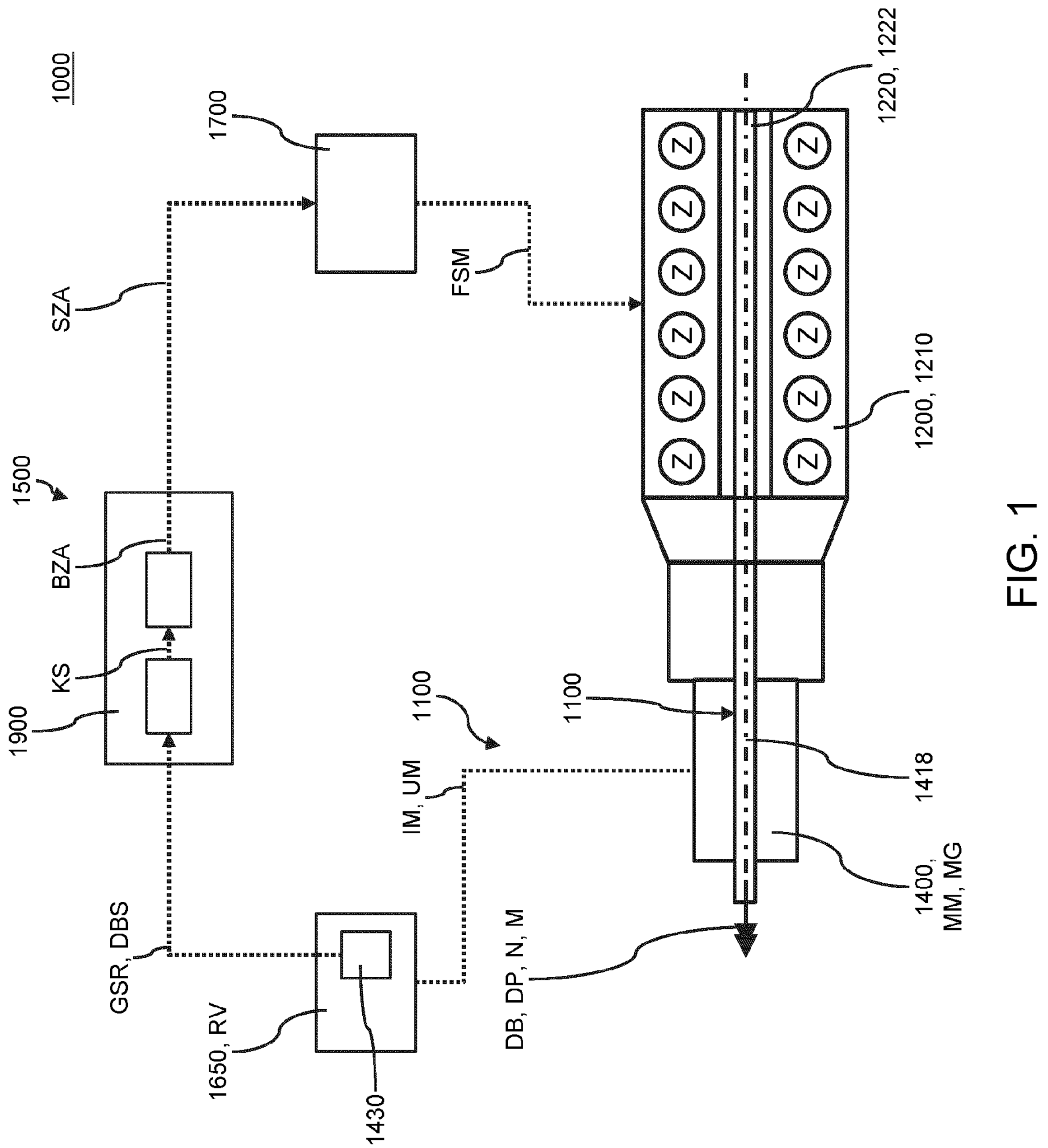
FIG. 1 is a optional embodiment of a hybrid drive according to the concept of the present invention.

FIG. 1 shows an optional embodiment of a hybrid drive 1000 according to the concept of the present invention. Hybrid drive 1000 includes an internal combustion engine 1200 having a combustion engine 1210. Hybrid drive 1000 also includes an electric machine 1400.

Electric machine 1400 can be operated in an engine mode MM as well as in a generator mode MG. Internal combustion engine 1200 and electric machine 1400 are connected in a torque transmitting manner via drive shaft 1100. In the present application, drive shaft 1100 is designed as a common shaft, thus including a rotor shaft of rotor 1418 of electric machine 1400 as well as an engine shaft 1220 of combustion engine 1210, optionally a crankshaft 1222, which is connected with the rotor shaft or rotor 1418 in a torsionally rigid manner. In other embodiments, electric machine 1400 and internal combustion engine 1200 can also be connected in other ways to transmit torque, for example via a gearbox, as long as rotor 1480 and engine shaft 1220 are in a fixed speed ratio to each other, meaning, they are connected to each other in a torsionally rigid manner.

Hybrid drive 1000 includes a converter 1650 for control of electric machine 1400, in particular for provision of a line current IM and/or a line voltage UM.

Converter 1650 includes a signal unit 1430 by way of which a rotational motion signal DBS can be provided as an electrical converter variable GSR. Rotational motion signal DBS describes indirectly or directly a rotational motion DB of rotor 1418, because the converter receives currents and/or voltages from electric machine 1400, in particular from rotor 1418 and/or stator 1408 of electric machine 1400.

Since rotor 1418 is connected via a rotor shaft of rotor 1418 of electric machine 1400 in a torsionally rigid manner or is connected to engine shaft 1220 of combustion engine 1210 with a fixed transmission- or reduction ratio, rotational motion signal DBS describes directly or indirectly a rotational motion DB of drive shaft 1100 and thus also of engine shaft 1220 of combustion engine 1210. The operating behavior—in particular the rotational motion—of engine shaft 1220 of combustion engine 1210 in turn contains information regarding a possible intermittent cylinder operation BZA of combustion engine 1200.

In one embodiment, rotational motion signal DBS can be provided in a different manner. In one embodiment, signal unit 1430 can be arrange outside converter 1640 or be part of another control unit.

Rotational motion signal DBS can be generated in different ways.

In some embodiments, rotational motion signal DBS can be provided as a measured rotational motion signal DBS_MEAS by way of a rotational sensor 1470.

In other optional embodiments, rotational motion signal DBS can be generated as a calculated rotational motion signal DBS_CALC, optionally based on line current IM and/or a line voltage UM and/or an induced counter voltage UG.

"Calculated" means in particular that the thus determined calculated rotational motion signal DBS_CALC is determined or recalculated on the basis of another value, optionally on the basis of line current IM and/or a line voltage UM and/or an induced counter voltage UG.

Signal unit 1430 is optionally designed to determine the calculated rotational motion signal DBS_CALC based on a mathematical machine model 1440, especially optionally by way of a comparison with reference counter-voltage values UG-REF and/or reference current values I_REF.

As a first exemplary possibility, sensor-less controls can be realized in block commutation by remeasuring the counter voltage induced in the motor. In sensor-less commutation, no separate sensors are used to record the current rotor position, but the information is obtained indirectly by measuring electrical parameters on the coils. Several methods are available for this purpose, such as the detection of the rotor position via the counter voltage initiated in the coils of the stator, which is evaluated by the electronic control circuit. This is an example of how a rotational motion signal DBS of drive shaft 1100 can be determined by way of an electrical converter variable GSR of converter 1650. An intermittent signal characterization KS of a momentary curve VM of electrical converter variable GSR can be determined in this way.

From the measured counter voltage, the speed curve can be calculated and thus the speed drop of the cylinder can also be detected. It is also possible to take the voltage signal directly to detect the misfire and search for the pattern that corresponds to the speed drop. One pattern could be, for example, a drop in the counter voltage, which indicates an intermittent cylinder operation BZA of combustion engine 1200.

As an additional exemplary, second possibility, a synchronous machine can be operated without sensors, by way of vector control. This is advantageously based on a mathematical calculation of the required control parameters. Decisive herein is a realistic software model of the electric machine that is as accurate as possible. With the help of said machine model, a digital signal process estimates the parameters required for vector control—for example the rotor angle and the speed. The decisive, and possibly only required measured values in this method are the three stator currents of the machine. This is an additional example as to how a rotational motion signal DBS of drive shaft 1100 can be determined by way of an electrical converter variable GSR of converter 1650. An intermittent signal characterization KS of a momentary curve VM of electrical converter variable GSR can thus be determined.

The rotational speed can be calculated with the help of the mathematical model. Thus, it is also possible to identify the pattern in the current signals, which can be assigned to a rotational speed drop, indicating an intermittent cylinder operation BZA of combustion engine 1200.

Hybrid drive 1000 generally includes a recognition unit 1900 which—on the basis of rotational motion signal DBS—is designed to detect an intermittent signal characterization KS and, in the presence of such a signal characterization KS, to indicate an intermittent cylinder operation BZA of combustion engine 1210. For example, intermittent cylinder operation BZA can be displayed as a warning message to an operator of hybrid drive 1000 and/or provided as an intermittent cylinder misfire signal SZA for an engine control unit 1700 of internal combustion engine 1200 as shown here. Engine control unit 1700 is optionally designed to activate a fail-safe mode FSM of internal combustion engine 1200 depending on cylinder misfire signal SZA. In particular, the power of internal combustion engine 1200 can be reduced in such a fail-safe mode FSM in order to avoid damage to internal combustion engine 1200, in particular to combustion engine 1210, in the event of a detected intermittent cylinder operation.

Figure 2:
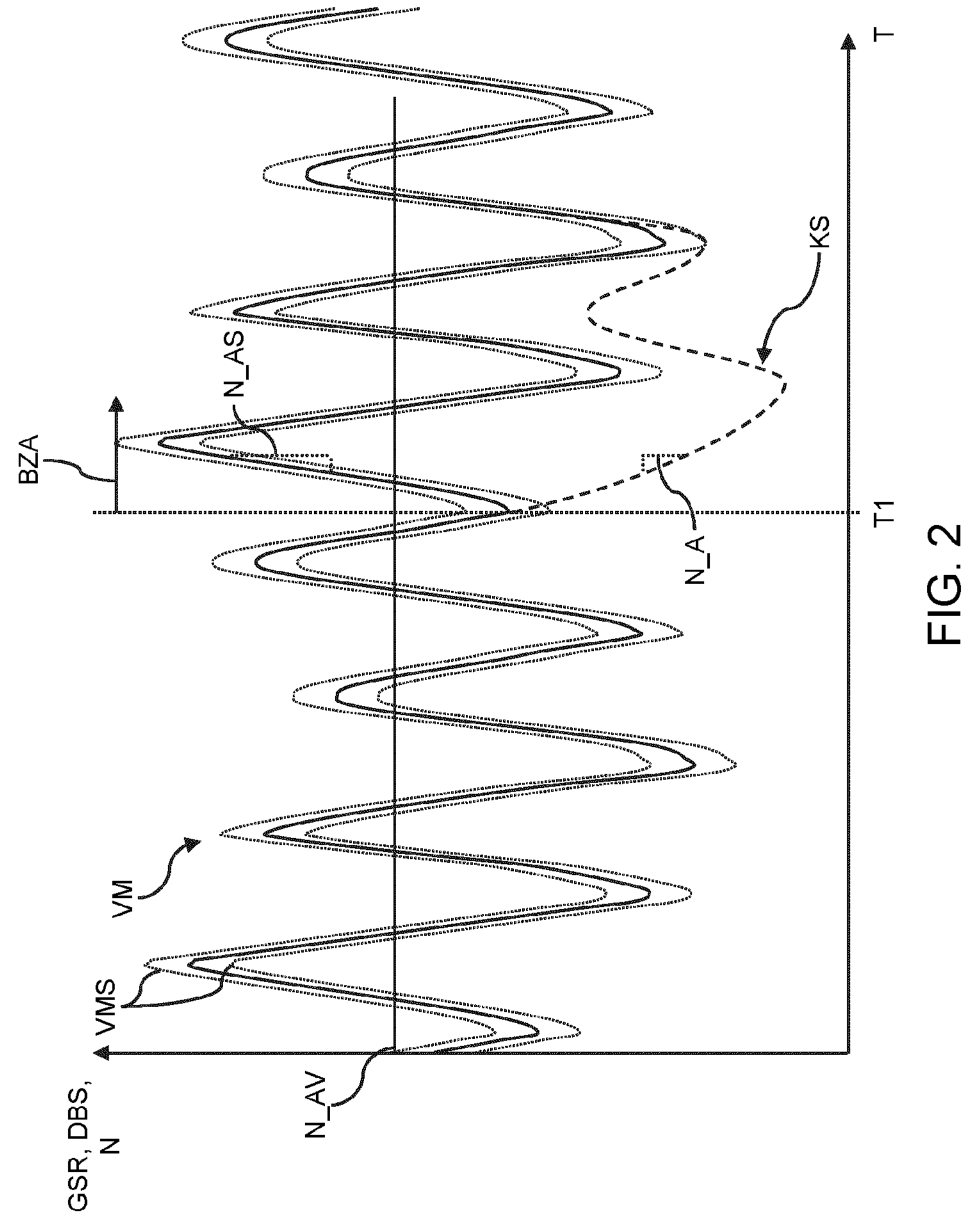
FIG. 2 is an exemplary momentary curve of a rotational motion signal as an electrical converter variable, wherein the rotational motion signal characterizes a speed.

FIG. 2 shows a momentary curve VM of a rotational motion signal DBS as an electrical converter variable GSR over time T; it could also be plotted over a crankshaft angle 1222*w* or an engine shaft angle 1220*w*, in particular in the present case a drive shaft angle 1100*w*—in other words, a rotation angle of drive shaft 1100. With the same resolution, this would only result in a different unit than the unit of time T chosen here.

In the present example, rotational motion signal DBS characterizes a rotational speed N of drive shaft 1100 over time T or a rotational angle of 1100*w*, 1220*w*, 1222*w*. In FIG. 2, an average speed of N_AV is shown as a considerable constant or only slowly changing variable, in other words, an average speed N_AV, which results, averaged over several complete cycles of rotational angle 1100*w*, 1220*w*, 1222*w*.

FIG. 2 also shows rotational motion signal DBS with a resolution over several full cycles of the angle of rotation, wherein the entire operating cycle of cylinders Z of engine 1210 or internal combustion engine 1200 is also resolved within a full cycle of the angle of rotation. A periodic oscillation of rotational motion signal DBS around average speed N_AV is thus visible.

The individual oscillations of rotational motion signal DBS are caused by ignitions in cylinders Z of internal combustion engine 1200; specifically, an increase in speed is regularly recorded when a cylinder is "ignited"; this leads to an ascending phase of rotational motion signal DBS after ignition shown here with a target rotational acceleration N_AS as shown here as an ascending gradient. At a point in time T1, an intermittent signal characterization KS, as would be caused by an intermittent ignition of a cylinder Z, is shown as a dashed curve. Due to the missing ignition, there is a temporary drop in speed N, which can only be compensated for by subsequent ignitions. The intermittent ignition at time point T1 thus initiates an intermittent cylinder operation BZA. In general, a signal characterization "KS" may in particular show a momentary curve of rotational motion signal DBS that deviates from an—in particular quasi-periodic—target momentary curve; in particular, it may include a curve with a lack of target rotational acceleration. In particular, a momentary curve that deviates from a target momentary curve includes an aperiodic momentary curve of the rotational motion signal.

A "signal characterization" thus includes in particular a decelerated, sub-optimal or missing rotational acceleration N_A, that is, angular velocity increase, in momentary curve VM of rotational motion signal DBS, in particular in comparison to a quasi-periodic nominal target momentary curve VMS according to the ignition behavior.

Recognition of signal characterization KS via recognition unit 1900 can occur in different ways. In the simplest case, a deviation of momentary curve VM of rotational motion signal DBS from the aforementioned target curve VMS can be determined, which-shown here schematically as a dotted line-surrounds momentary curve VM as a corridor.

Also, as mentioned above, a rotational acceleration N_A or angular acceleration based on speed signal N can be created by creating the derivative of rotational motion signal DBS shown here. In this manner, a deviation and an intermittent signal characterization KS can also be determined by way of a target-actual comparison. In the current example, a first, actual rotational acceleration is shown N_A, which N_AS deviates from the above referenced target rotational acceleration that would have been expected after ignition. Actual rotational acceleration N_A shows a curve in which the ascending phase of the rotational motion signal DBS is noticeably absent, in other words, a target rotational acceleration N_AS as an ascending gradient is missing—in the current example, the gradient of the rotational acceleration N_A is negative after time T1; in other words it is decreasing—thus in contrast to the expectation of an ascending gradient in the target rotational acceleration N_AS after ignition; the ascending phase of rotational motion signal DBS is noticeably missing.

Other methods of sample recognition and/or signal processing known to the expert may also be used to detect signal characterization KS. In particular, this includes a momentary curve of rotational motion signal DBS that deviates from a—in particular quasi-periodic—target momentary curve and/or a lack of target rotational acceleration N_AS.

As shown here, the prerequisite is a sufficiently temporally resolved rotational motion signal DBS for recognition of such signal characterization KS. For the purpose of commutation, high demands are imposed on converter 1650 in this regard. Therefore, electrical converter variable GSR provides such a temporal resolution, in particular the sampling frequency, which—as can be seen in FIG. 2—is optionally a multiple of the rotational frequency or speed, in order to resolve the entire operating cycle of cylinders Z of engine 1210 or of internal combustion engine 1200 within a full period of the angle of rotation.

Figure 3:
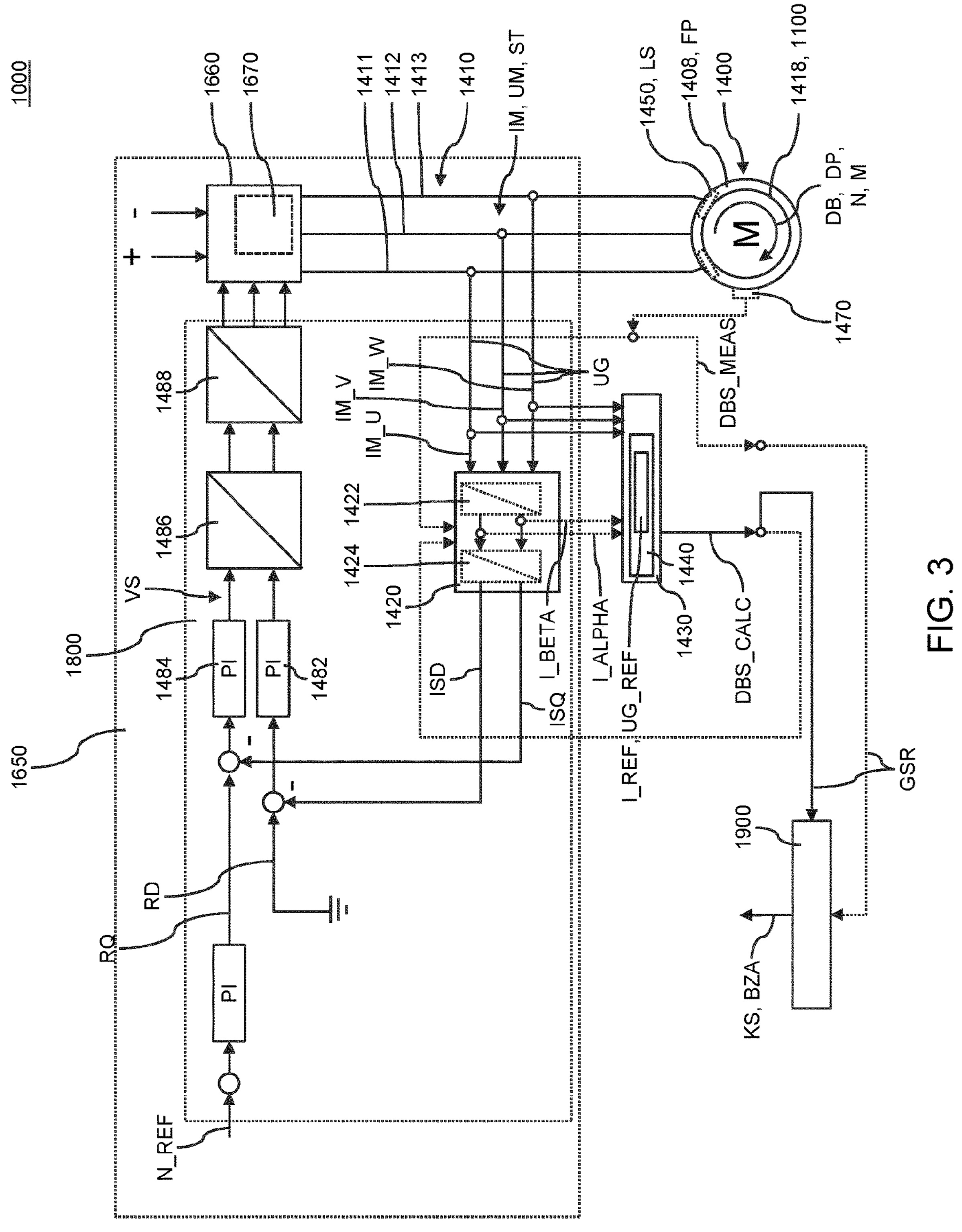
FIG. 3 is a schematic sectional illustration of a hybrid internal combustion engine according to the concept of the present invention with detailed illustration of a converter of a control unit.

FIG. 3 shows a schematic, sectional representation of a hybrid drive 1000 according to the concept of the present invention with a detailed representation of a converter 1650 and a control unit 1800. Control unit 1800 can thereby be designed in particular as part of converter 1650.

In the current example, converter 1650 has a four-quadrant actuator 1660, which is electrically connected to a stator 1408 of electric machine 1400 via a first conductor 1411, a second conductor 1412 and a third conductor 1413. A temporally varying physical field FP is generated by stator 1408 to drive a rotor 1418 via a line current IM conducted by conductors 1411, 1412, 1413, namely a first line current IM_U, a second line current IM_V and a third line current IM_W.

Optionally, a line current and/or the line voltage and/or the counter voltage is measured on at least two conductors, optionally two or three conductors. The conductors—as in the current example—are optionally electrical conductors such as aforementioned conductors 1411, 1412, 1413 in the vicinity of the converter or on, or respectively in the converter. In particular, the conductors can be those of an electrical supply line to the converter.

In a modified further development, the conductors can essentially also include the conductors of a stator of the electric machine. Optionally, a timing signal can be picked up by the line current of a conductor, in particular a supply line in the vicinity of the converter or on, or respectively in the converter and/or on the conductor of a stator of the electric machine.

Control unit 1800 has a conversion unit 1420 with a Clarke 1422 transformer. Clarke transformer 1422 is designed to convert the line currents IM_U, IM_V, IM_W measured on conductors 1411, 1412, 1413 and which represent a triaxial coordinate system related to stator 1420, into a biaxial system. In particular, due to the fact that the sum of the three line currents IM_U, IM_V IM_W is equal to zero at all times, only two of the three line currents IM_U, IM_V, IM_W are needed for further calculation by conversion unit 1420.

As a result of this conversion, Clarke transformer 1422 provides line current IM in the form of a first biaxial current value I_ALPHA and a second biaxial current value I_BETA. Conversion unit 1420 also has a Park transformer 1424, which is designed to provide a first indicator current value ISD, and a second indicator current value ISQ based on the two biaxial current values I_BETA I_ALPHA. The two indicator current values ISD, ISQ calculated by the Park transformer 1424, are provided in particular as input for a first PI controller 1482 and a second PI controller 1484.

PI controllers 1482, 1484, provide a target vector VS which is allocated by an inverse Park transformer 1486 and subsequently by an inverse Clarke transformer 1488—analogous to conversion unit 1420 described above—to a transformed target vector VST for four-quadrant actuator 1660.

Conversion unit 1420 is designed to convert the three-phase line currents IM_U, IM_V, IM_W of electric machine 1400 into a biaxial form, in particular into a biaxial coordinate system that rotates with the rotational motion of rotor 1418. For this conversion, and especially for commutation, knowledge of the exact rotation position DP of rotor 1418 is required. To determine the rotational position DP, control unit 1800 can have a signal unit 1430. Signal unit 1430 is designed based on the evaluation of an electromotive force on a winding of stator 1408 and/or via the biaxial current values I_ALPHA, I_BETA and/or by the determination of line currents IM and/or by the determination of a counter voltage UG, optionally induced by rotor 1418 into stator 1408, and/or by the determination of winding inductance LS of a stator winding 1450, to determine the rotational position DP mathematically, advantageously without a rotational sensor 1470, and to provide DBS_CALC as an electrical converter variable GSR in the form of a calculated rotational motion signal. Alternatively, or in addition, converter 1650 may also have a similar sensor for determining a measured rotational motion signal DBS_MEAS.

Regardless of the specific functionality of converter 1650, which is described herein as an example, a rotational motion signal DB, optionally a calculated rotational motion signal DBS_CALC, is required for commutation. Rotational motion signal DBS is provided as an electrical converter variable GSR.

COMPONENT REFERENCE LISTING

1000 hybrid drive
1100, 1100W drive shaft, angle of rotation of engine shaft
1200 internal combustion engine
1210 combustion engine
1220, 1220W engine shaft, angle of rotation of engine shaft
1222, 1222W crankshaft, angle of rotation of crankshaft
1400 electric machine
1408 stator of electric machine
1410 electric conductor, stator conductor of electric machine
1411 first conductor of stator of electric machine
1412 second conductor of the stator of electric machine
1413 third conductor of the stator of electric machine
1418 rotor of electric machine
1420 conversion unit
1422 Clark transformer
1424 Park transformer
1430 signal unit
1440 mathematical machine model
1450 stator winding
1470 (external) rotational sensor
1480 rotor of electric machine
1482 first PI controller
1484 Second PI controller
1650 converter
1660 four-quadrant actuator
1700 engine control unit of internal combustion engine
1800 automatic controller
1900 recognition unit
3000 vehicle
3010 watercraft
3020 land vehicle
3030 aircraft
BZA intermittent cylinder operation
DB rotation
DBS rotational motion signal
DBS_CALC calculated rotational motion signal
DBS_MEAS measured rotational motion signal
DP rotational position, rotational position of the shaft
FP physical field
FSM fail-safe mode
GSR electrical converter variable
IM line current
ISD first indicator current value
ISQ second indicator current value
I_ALPHA first biaxial current value
I_BETA Second biaxial current value
IM line current
KS signal characterization
LS winding inductance
MG generator mode of electric machine
MM engine mode of electric machine
N speed
N_A rotational acceleration, angular acceleration
N_AS target rotational acceleration
N_AV average speed
ST timing signal
SZA cylinder misfire signal
UG counter voltage
AT line voltage
VM momentary curve
VMS Target curve
VS target vector
VST transformed target vector
Z cylinder of internal combustion engine While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a hybrid drive, the method comprising the steps of:

providing an internal combustion engine, an electric machine, a converter, and a drive shaft, the internal combustion engine including a combustion engine, the converter being electrically connected to the electric machine, the internal combustion engine and the electric machine being connected to each other in a torque-transmitting manner by way of the drive shaft;

determining a rotational motion signal associated with the drive shaft, the rotational motion signal being determined by way of an electrical converter variable of the converter; and determining a signal characterization of a momentary curve of the electrical converter variable, the signal characterization indicating an intermittent cylinder operation of the combustion engine, wherein, in the event of a notification of the signal characterization, a fail-safe operating mode of the internal combustion engine is activated.

2. The method according to claim 1, wherein the signal characterization exhibits a momentary curve of the rotational motion signal that deviates from a quasiperiodic target momentary curve.

3. The method according to claim 1, wherein the electrical converter variable (i) is at least one of a converter current, a converter voltage, a line current of the converter, a line voltage of the converter, and a counter voltage of the converter, or (ii) encompasses one of the converter current, the converter voltage, the line current of the converter, the line voltage of the converter, and the counter voltage of the converter.

4. The method according to claim 1, wherein the rotational motion signal is determined by way of a sum of a line current and a phase position of the line current.

5. The method according to claim 1, wherein the rotational motion signal is determined by way of a sum of a line current and a phase position of the line current in relation to a momentary voltage of the converter.

6. The method according to claim 1, wherein the electric machine is controlled by the converter by way of a vector control.

7. The method according to claim 1, wherein the electric machine is controlled by the converter by way of a vector control by way of a sensor-less vector control.

8. The method according to claim 1, wherein at least one of a rotational motion (DB) and the signal characterization is determined by way of the momentary curve of the electrical converter variable and by a mathematical machine model.

9. The method according to claim 1, wherein the electrical converter variable is a counter voltage.

10. The method according to claim 1, wherein the electrical converter variable is a counter voltage initiated in the stator, wherein at least one of a rotational motion and the signal characterization is determined by way of the momentary curve of the electrical converter variable and by a mathematical machine model, wherein a mathematical machine model includes a plurality of reference counter voltage values which are respectively allocated to a value for a calculated rotational position, wherein the calculated rotational position is determined in that the counter voltage is assigned to a suitable reference counter voltage value.

11. The method according to claim 1, wherein the electrical converter variable is a line current.

12. The method according to claim 1, wherein the converter includes an inverter that has a plurality of bipolar transistors, wherein the plurality of bipolar transistors are timed by way of a rotational motion.

13. A hybrid drive, comprising:

an internal combustion engine including a combustion engine;

a converter;

an electric machine to which the converter is electrically connected;

a drive shaft, the combustion engine and the electric machine being connected to each other in a torque-transmitting manner by way of a drive shaft, the hybrid drive being configured for determining a rotational motion signal associated with the drive shaft, the hybrid drive being configured for determining the rotational motion signal by way of an electrical converter variable of the converter; and a recognition unit, which is configured for:

determining a signal characterization of a momentary curve of the electrical converter variable; and indicating an intermittent cylinder operation of the internal combustion engine as a function of the signal characterization, wherein, in the event of a notification of the signal characterization, a fail-safe operating mode of the internal combustion engine is activated.

14. The hybrid drive according to claim 13, further comprising a signal unit, wherein at least one the converter and the signal unit is configured for determining the rotational motion signal by way of the electrical converter variable of the converter.

15. The hybrid drive according to claim 13, further comprising sensor-less control, wherein the electric machine is controlled by the converter by way of the sensor-less control.

16. The hybrid drive according to claim 13, wherein the electrical converter variable includes at least one of a converter current and a converter voltage.

17. The hybrid drive according to claim 13, wherein the converter includes an inverter that includes a plurality of bipolar transistor, wherein respective ones of the plurality of bipolar transistors are timed by way of a rotational motion.

18. A vehicle, comprising:

at least one of:

(a) a hybrid drive, including:

an internal combustion engine including a combustion engine;

a converter;

an electric machine to which the converter is electrically connected;

a drive shaft, the combustion engine and the electric machine being connected to each other in a torque-transmitting manner by way of a drive shaft, the hybrid drive being configured for determining a rotational motion signal associated with the drive shaft, the hybrid drive being configured for determining the rotational motion signal by way of an electrical converter variable of the converter; and a recognition unit, which is configured for:

determining a signal characterization of a momentary curve of the electrical converter variable; and indicating an intermittent cylinder operation of the internal combustion engine as a function of the signal characterization, wherein, in the event of a notification of the signal characterization, a fail-safe operating mode of the internal combustion engine is activated; and (b) a control unit, wherein the control unit is configured for implementing a method for operating the hybrid drive, the method including the steps of:

providing the internal combustion engine, the electric machine, the converter, and the drive shaft, the internal combustion engine including the combustion engine, the converter being electrically connected to the electric machine, the internal combustion engine and the electric machine being connected to each other in the torque-transmitting manner by way of the drive shaft;

determining the rotational motion signal associated with the drive shaft, the rotational motion signal being determined by way of the electrical converter variable of the converter; and determining the signal characterization of the momentary curve of the electrical converter variable, the signal characterization indicating the intermittent cylinder operation of the combustion engine, wherein, in the event of a notification of the signal characterization, a fail-safe operating mode of the internal combustion engine is activated.

19. The vehicle according to claim 18, wherein the vehicle is a watercraft, a land vehicle, or an aircraft.

* * * * *